United States Patent
Bales et al.

(10) Patent No.: US 9,840,206 B2
(45) Date of Patent: Dec. 12, 2017

(54) MULTIPURPOSE UTILITY BOARD FOR VEHICLE TAILGATE

(71) Applicants: Steven Bales, Davie, FL (US); Cory Weech, Davie, FL (US); Michael Mehdipour, Lighthouse Point, FL (US)

(72) Inventors: Steven Bales, Davie, FL (US); Cory Weech, Davie, FL (US); Michael Mehdipour, Lighthouse Point, FL (US)

(*) Notice: Subject to any disclaimer, the term of this patent is extended or adjusted under 35 U.S.C. 154(b) by 0 days.

(21) Appl. No.: 14/807,695

(22) Filed: Jul. 23, 2015

(65) Prior Publication Data
US 2016/0023691 A1 Jan. 28, 2016

Related U.S. Application Data

(60) Provisional application No. 62/027,786, filed on Jul. 23, 2014.

(51) Int. Cl.
| | | |
|---|---|---|
| *B60R 9/06* | (2006.01) | |
| *B60R 11/00* | (2006.01) | |
| *B62D 33/027* | (2006.01) | |

(52) U.S. Cl.
CPC ........... *B60R 9/06* (2013.01); *B60R 11/00* (2013.01); *B60R 2011/0036* (2013.01); *B62D 33/0273* (2013.01)

(58) Field of Classification Search
CPC . A47J 47/005; B60R 9/06; B60R 9/08; B62D 33/0207; B62D 33/0273
See application file for complete search history.

(56) References Cited

U.S. PATENT DOCUMENTS

| | | | | |
|---|---|---|---|---|
| 4,907,789 A * | 3/1990 | Tice | ............... | A47J 47/005 269/13 |
| 5,000,503 A * | 3/1991 | Bernatek | ............... | B60R 13/01 296/39.2 |
| 5,205,446 A * | 4/1993 | Greenberg | ............... | B60R 9/02 224/497 |
| 5,372,397 A * | 12/1994 | Arndt | ............... | B60R 13/01 296/39.2 |
| 5,435,473 A * | 7/1995 | Larkum | ............... | B60R 9/08 211/4 |
| 6,026,972 A * | 2/2000 | Makowski | ............... | A47J 47/005 220/495.08 |
| 6,206,445 B1 * | 3/2001 | Brooks | ............... | A47J 47/005 296/39.2 |
| 8,127,689 B2 * | 3/2012 | Christian | ............... | A47B 3/0912 108/11 |
| 8,651,289 B2 * | 2/2014 | Diaz, Jr. | ............... | A01K 97/08 206/315.1 |
| 9,010,759 B2 * | 4/2015 | McDonnell | ............... | A63F 9/00 273/342 |

(Continued)

*Primary Examiner* — Glenn Dayoan
*Assistant Examiner* — Paul Chenevert
(74) *Attorney, Agent, or Firm* — Mark D. Bowen; Malin Haley DiMaggio & Bowen, P.A.

(57) ABSTRACT

A utility board that may be securely attached to a tailgate. The utility board may include a cutting board, a channel for collecting fluids, one or more connection sites that may be located in various positions about utility board. The utility board may optionally include a rinsing device, electrical outlets, one or more heating elements, one or more utensil holders, and/or accessories for use in recreational activities such as playing games.

20 Claims, 5 Drawing Sheets

(56) References Cited

U.S. PATENT DOCUMENTS

| | | | |
|---|---|---|---|
| D761,185 S * | 7/2016 | Coyle | B60R 13/01 D12/221 |
| 2002/0070575 A1* | 6/2002 | Leftridge | B60J 7/041 296/56 |
| 2004/0245805 A1* | 12/2004 | Jaeck | B60P 3/14 296/182.1 |
| 2005/0029747 A1* | 2/2005 | Grayson | A63F 7/0017 273/342 |
| 2005/0062309 A1* | 3/2005 | Juzwiak | B62D 33/0273 296/51 |
| 2005/0248075 A1* | 11/2005 | McLaughlin | A47J 47/005 269/289 R |
| 2008/0185861 A1* | 8/2008 | Johnson | B60P 3/14 296/26.11 |
| 2008/0190977 A1* | 8/2008 | Estabrook | B62D 33/0273 224/404 |
| 2008/0231067 A1* | 9/2008 | Nagle | B60P 3/07 296/50 |
| 2009/0014935 A1* | 1/2009 | Zeng | A47J 47/005 269/302.1 |
| 2009/0025417 A1* | 1/2009 | Azzara | A01K 97/00 62/457.1 |
| 2014/0027966 A1* | 1/2014 | Constantino, Jr. | A47J 47/005 269/15 |
| 2014/0252718 A1* | 9/2014 | Rieman | A63B 67/007 273/342 |
| 2014/0255572 A1* | 9/2014 | Lewallen | A47J 47/005 426/416 |
| 2015/0230666 A1* | 8/2015 | MacKelvie | A47J 47/005 269/289 R |
| 2016/0107584 A1* | 4/2016 | Coyle | B60R 13/01 224/403 |
| 2017/0203701 A1* | 7/2017 | Stojkovic | B60R 11/00 |

* cited by examiner

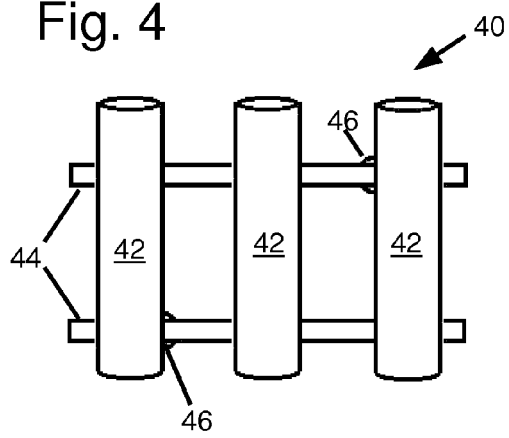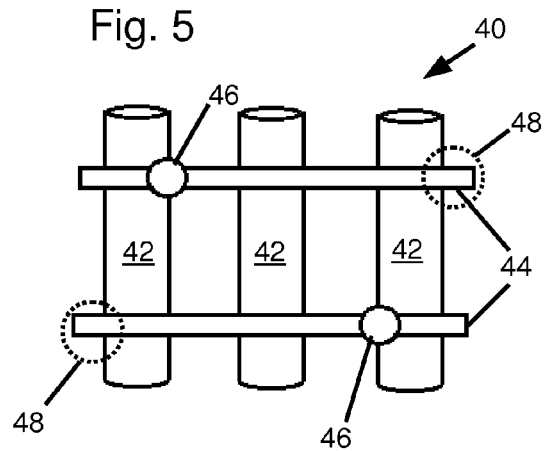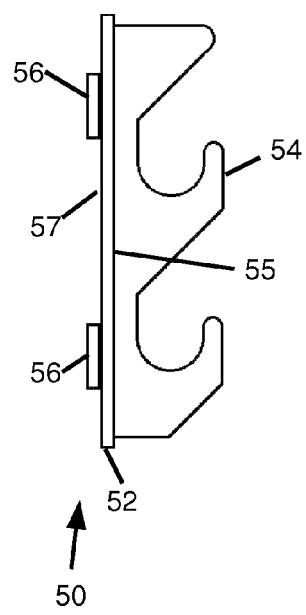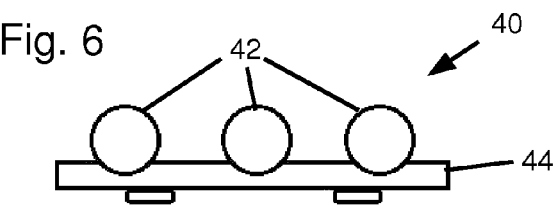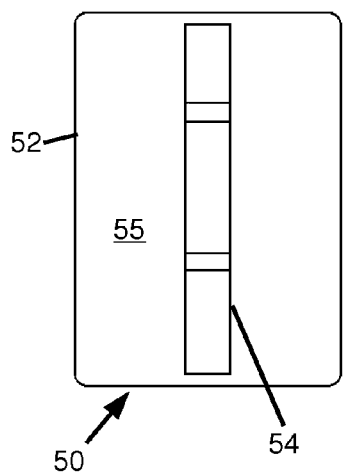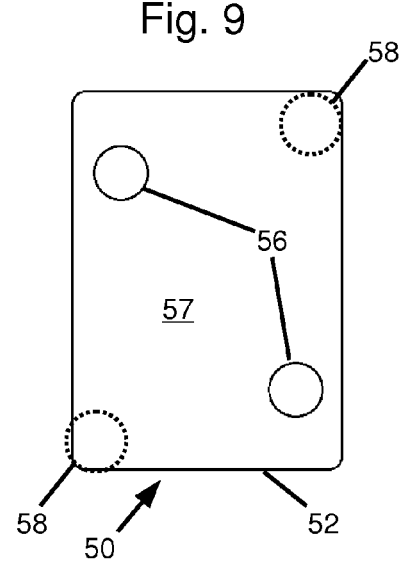

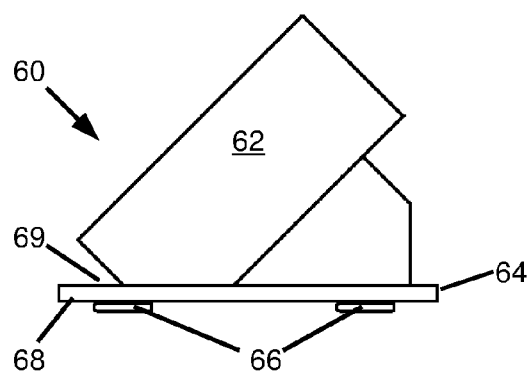
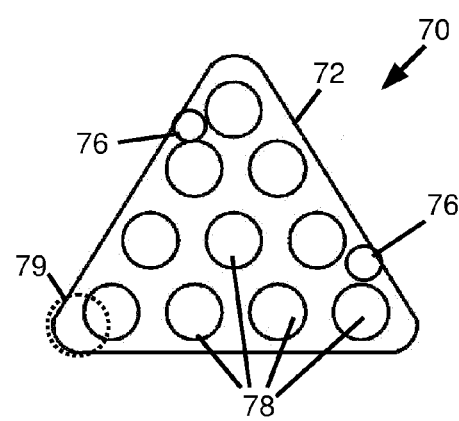
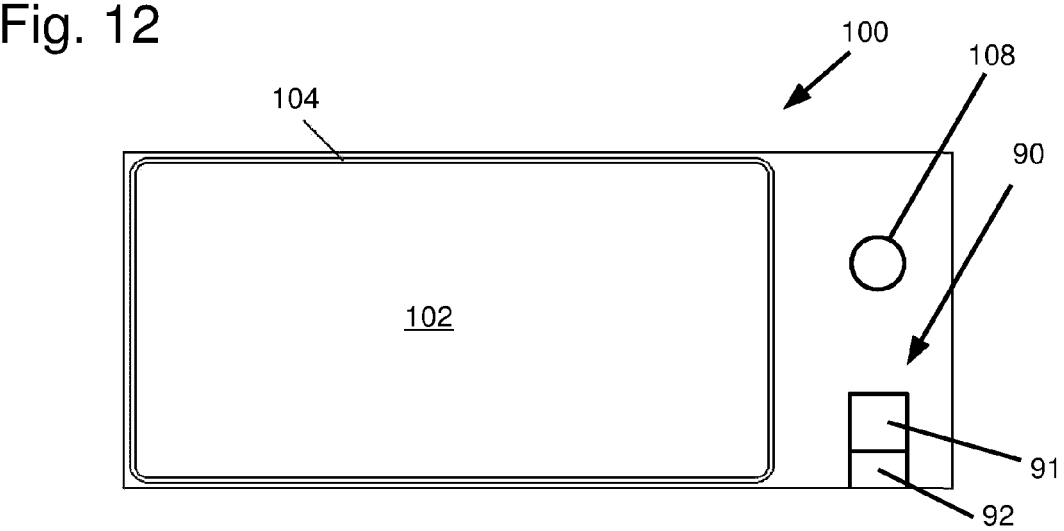

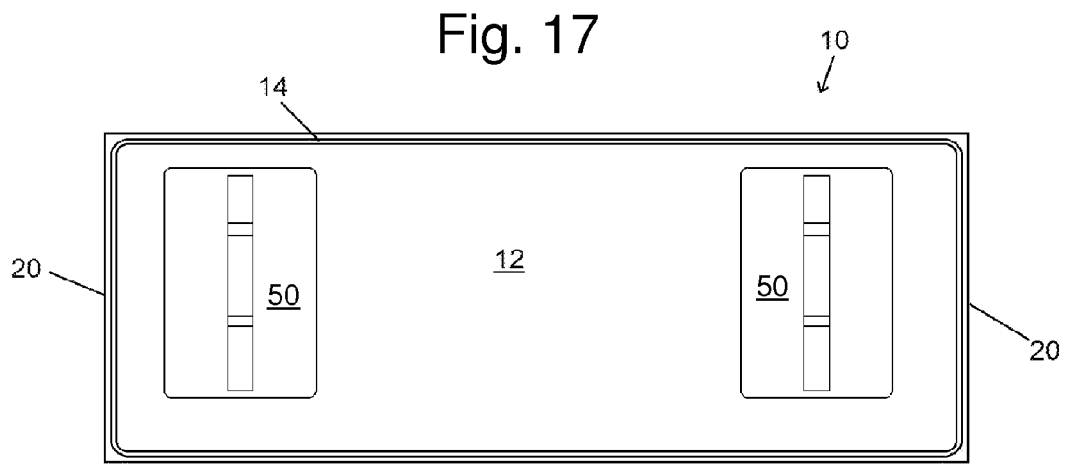
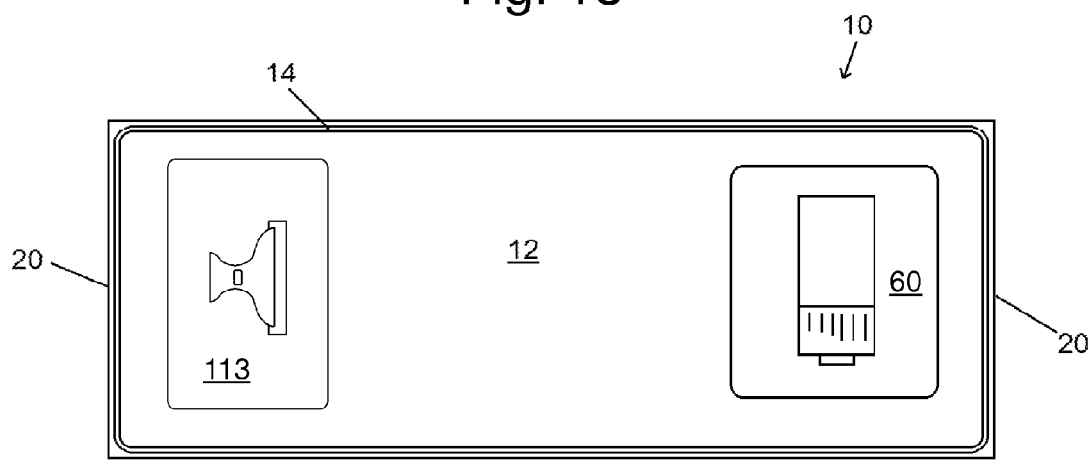

MULTIPURPOSE UTILITY BOARD FOR VEHICLE TAILGATE

CROSS-REFERENCE TO RELATED APPLICATIONS

This application claims priority to U.S. Provisional Application Ser. No. 62/027,786 filed on Jul. 23, 2014, the contents of which are hereby incorporated by reference.

STATEMENT REGARDING FEDERALLY SPONSORED RESEARCH OR DEVELOPMENT

Not Applicable.

NAMES OF PARTIES TO A JOINT RESEARCH AGREEMENT

Not Applicable

REFERENCE TO SEQUENCE LISTING, A TABLE, OR A COMPUTER PROGRAM LISTING APPENDIX SUBMITTED ON A COMPACT DISC AND INCORPORATION-BY-REFERENCE OF THE MATERIAL

Not Applicable.

COPYRIGHT NOTICE

Not Applicable

FIELD OF ENDEAVOR

The present invention relates to systems and methods for modifying a tailgate to perform multiple functions. More particularly, the invention relates to a utility board having one or more accessories for use with a tailgate of a vehicle or other object that provides a workstation having multiple uses and functions.

BACKGROUND INFORMATION

Pickup trucks, certain SUVs, and other vehicles typically include a bed or cargo area behind the cab of the vehicle that is accessible by opening a hinged gate, commonly referred to as a tailgate. Such utilitarian vehicles are often used to transport tools, equipment, or other work-related items to a worksite. Such vehicles are also used to transport hunting, fishing, and camping gear into the field, or to transport sports-related items or other recreational items as needed or desired.

The tailgate of a pickup truck or SUV has been found to be useful as a workstation or workbench when in the field. Such workstations can be created by opening the tailgate into a flat horizontal position and using the tailgate and truck bed as a support surface for performing various tasks. In some instances, toolboxes or storage compartments can be mounted to a vehicle such that they are accessible by simply lowering the tailgate. However, most of such workstations incorporated with the tailgate require the tailgate to be lowered and the workstation to be reconfigured before it can be used. This often requires additional effort and time to reconfigure the tailgate into a workstation before work can be performed, and this presents an inconvenience to the user.

When hunting, fishing or camping it may be desirable to modify a tailgate to serve as a cutting board, or a board for cleaning fish or other wildlife. When at a sporting event or celebratory event, it may be desirable to use the tailgate for recreational purposes, such as for playing games that require a table.

In view of the foregoing, there is a need for an apparatus and method for increasing the functionality of a tailgate. It is therefore desirable to provide an apparatus and method for adding a plurality of functions to a tailgate.

BRIEF SUMMARY OF THE INVENTION

Accordingly, the primary object of the present invention is to provide a utility board attached to the inside of a tailgate that does not interfere with the raising and lowering of the tailgate and provides several utilitarian features.

In greater detail, a tailgate mounted utility board may have a planar body having a front, a rear, two sides, a top and a bottom. The bottom includes one or more mechanisms for attachment to the inside wall of a tailgate. The utility board does not interfere with the ability of the tailgate to be raised and lowered between the open and closed positions. The utility board includes a cutting board and one or more connection sites for attachment of accessories.

The tailgate mounted utility board is adapted to attach to accessories and may have integrated components. These accessories and components may include one or more devices selected from the group consisting of ornamentation, a peripheral collection channel, game attachments, a tool organizer, securing devices or clips, a collection container, a water dispenser, a collection channel, a sharpener, a gun/fishing pole rack, a hotplate, a light, one or more auxiliary arms, a trash bag holder, a dispensing box, a cup holder, attachments for party games and a paper towel holder.

These and other objects and advantages of the present invention will become apparent from a reading of the attached specification and appended claims. There has thus been outlined, rather broadly, the more important features of the invention in order that the detailed description thereof that follows may be better understood, and in order that the present contribution to the art may be better appreciated. There are features of the invention that will be described hereinafter and which will form the subject matter of the claims appended hereto.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein:

FIG. 4 is front view of a fishing rod holder accessory for use with a utility board in accordance with the principles of the invention;

FIG. 5 is a rear view of a fishing rod holder accessory for use with a utility board in accordance with the principles of the invention;

FIG. 6 is a top plan view of a fishing rod holder accessory for use with a utility board in accordance with the principles of the invention;

FIG. 7 is a side elevational view of a gun rack accessory for use with a utility board in accordance with the principles of the invention;

FIG. 8 is a front plan view of a gun rack accessory for use with a utility board in accordance with the principles of the invention;

FIG. 9 is a rear view of a gun rack accessory for use with a utility board in accordance with the principles of the invention;

FIG. 10 is a side elevational view of a utensil holder accessory for use with a utility board in accordance with the principles of the invention;

FIG. 11 is a bottom plan view of a beer pong accessory for use with a utility board in accordance with the principles of the invention;

FIG. 12 is an alternative embodiment of a utility board in accordance with the principles of the invention;

FIG. 17 is a top plan view of a utility board of FIG. 1 having two gun rack accessories attached in accordance with the principles of the invention;

FIG. 18 is a top plan view of a utility board of FIG. 1 with a clamp accessory and a utensil holding accessory attached in accordance with the principles of the invention.

DETAILED DESCRIPTION

Figure 1:
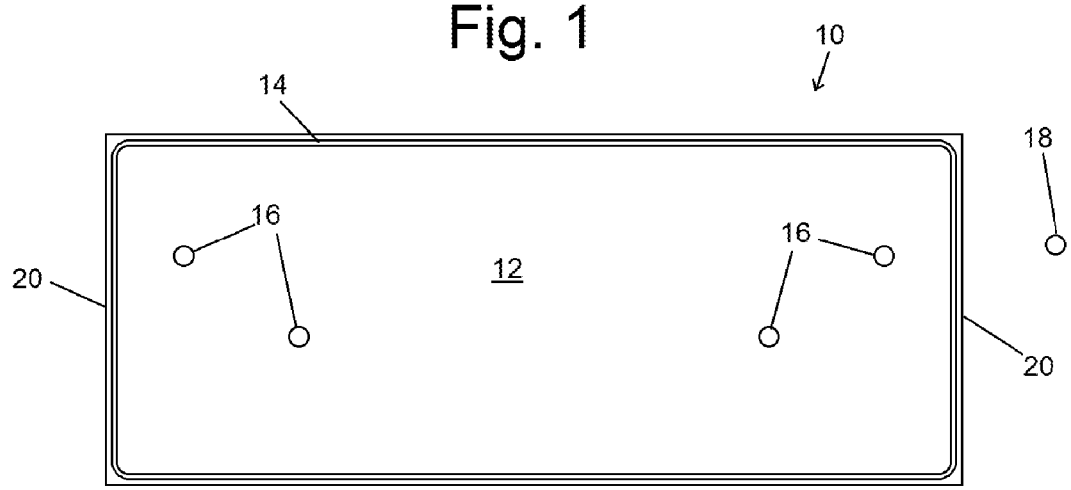
FIG. 1 is a top plan view of a utility board in accordance with the principles of the invention.

Before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

Disclosed is a multipurpose utility board that may serve as a liner for a tailgate in accordance with the principles of the invention. The multipurpose utility board may include a top surface that may be used as a cutting board, a peripheral channel for collecting fluids, and one or more connection sites that may be located in various positions about the utility board. The utility board may optionally include a rinsing device, electrical outlets, one or more heating elements, one or more utensil holders, and/or accessories for use in recreational activities such as playing games.

The utility board may include a cutting board and may be designed to be permanently affixed to the interior wall of the tailgate of a pickup truck. The cutting board may be formed from any suitable material such as high density polyethylene, stainless steel or the like. The cutting board may be affixed to the tailgate by means of pre-drilled holes commonly found in tailgates. Optionally, other mechanisms may be used to attach the cutting board to the tailgate. The cutting board may incorporate one or more of the following removably attachable or permanently affixed accessories or features:

Ornamentation—slogans, logos and/or trademarks of athletic teams or other designs.

Collection Channel—a groove in the cutting board along its periphery as is commonly found on cutting boards for collecting fluids during cleaning of a fish or animal or other activities.

Game Attachments—attachments that may be removably affixed to the cutting board to allow the tailgate to be used for various games, such as beer pong or other games utilizing a flat planar surface approximately the size of a tailgate.

Tool Organizer—a structure for supporting, securing and retaining instruments such as knives or other kitchen utensils.

Securing Device or Clip—a spring-loaded clip, vice or similar structure for securing an object such as a fish during filleting, cleaning, or otherwise processing.

Collection Container—a bowl or other container for collecting items to be disposed of, such as bones, skin, viscera or for collecting portions of an animal to be consumed.

Water Dispenser—a hose that may have a nozzle or an elongate tubing having several nozzles that may be attached to a water source and used to rinse or clean the cutting board and/or objects on the cutting board.

Fluid Capture Channel—a strip of rubber or other material that may be placed between the tailgate and the bed of the truck, which may form a channel to collect water, liquids or other fluids and prevent them from spilling into the truck bed and to better regulate runoff and disposal.

Sharpener—a knife or other tool sharpener.

Gun Rack and Fishing Rod Holder—a gun or fishing pole holding device that may secure a long barreled weapon when the tailgate is both in the up and down positions.

Hotplate—a hot plate or griddle.

Lighting—a bracket or other device having lights that may be directed toward the cutting board.

Auxiliary Arms—one or more arms or small platforms that may be pivotally attached to the cutting board and designed to swivel outward to provide additional workspace.

Trash Bag Holder—a loop or other device for holding a trash bag for wastebasket.

Dispensing Box—a box for dispensing facial tissue, ZIPLOCK bags, wet naps, rubber gloves or the like.

Paper Towel Holder.

FIG. 1 shows a multipurpose utility board 10 in accordance with the principles of the invention. The utility board 10 may have a top surface 12. A collection channel 14 may extend about the periphery of the top surface 12 of the board 10. This channel may collect liquids, for example when an animal or fish is being cleaned. The top surface 12 may also include four connection sites 16. In this embodiment, each of the collection sites 16 may be a shallow cavity having a magnet at the bottom or floor of the cavity. As will be explained in more detail below, these shallow magnetic cavities may be used to attach various accessories. The utility board may also include plugs 18 that may be inserted into the connection sites 16 when they are not in use.

In this embodiment, the connection sites 16 are arranged such that a line connecting them forms an angle of between 30° and 60° with the sides 20 of the utility board 10. The connection sites 16 are also arranged in pairs, two on one side and two on the other. It may be desirable to utilize one connection site or more than two connection sites arranged in different configurations.

Figure 2:
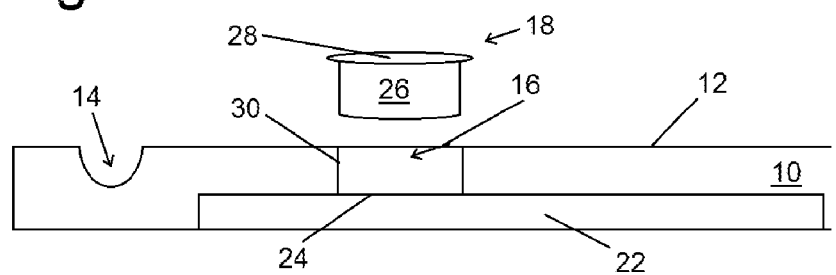
FIG. 2 is a side cross-sectional view of a portion of the utility board of FIG. 1 in accordance with the principles of the invention.

FIG. 2 shows an enlarged cross-section of a portion of the utility board 10. In this embodiment, the collection channel 14 has a depth equal to about one half the total depth of the board. The connection site 16 is in the form of a shallow circular cavity having a circular side wall 30 and a floor 24. An anchor magnet 22 may be incorporated into the bottom of the utility board 10. The anchor magnet 22 may also form the floor 24 of the connection site 16. The floor 24 may also include a laminate or coating to prevent deterioration of the anchor magnet 22 and/or the floor 24. A utility board may be exposed to many different environments, chemicals and forces. It may therefore be desirable to treat all or some aspects of the utility board to protect and improve durability of the materials used for the board 10.

FIG. 2 also shows plug 18 which may be comprised of a body 26 and a cap 28. The body 26 may be configured to engage the walls 30 of the connection site 16 with an interference fit. Optionally, the body 26 and connection site walls 30 may be threaded, include a twist lock or have another mechanism for removably securing the plug 18 to the connection site 16. When a connection site 16 is not in use, it may be desirable to affix plug 18 to the connection site 16 both to prevent dirt, mud or other materials from entering the connection site 16 and to provide a more aesthetically pleasing appearance.

The anchor magnet 22 may be larger or smaller than the area of the floor 24 of the connection site 16. It may be desirable to use an extremely high strength magnet for the anchor magnet 22 so that items connected to the utility board 10 may remain attached when supporting substantial weight and traveling at high speed over uneven surfaces.

Figure 3:
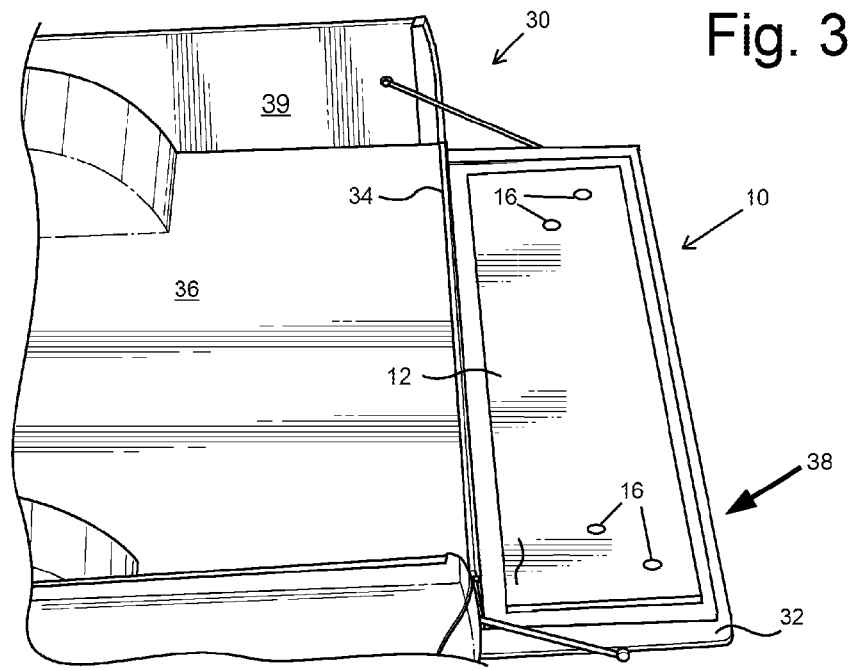
FIG. 3 is a perspective environment view of a utility board attached to a tailgate in accordance with the principles of the invention.

FIG. 3 shows the multipurpose utility board 10 attached to a truck 30. The utility board 10 may be securely fixed to the interior wall 32 of the tailgate 38 which may be attached to a truck bed 36 by a hinge 34. The utility board 10 may be secured to the interior wall 32 by any suitable mechanism known in the art such as for example nuts, bolts, screws, cements, adhesives, glues or other connection devices. The utility board may be affixed to the interior wall 32 of the tailgate 38 in the same manner by which a typical bed liner is affixed to a truck bed such as bed 36. It may be desirable for the utility board 10 to remain attached to the tailgate 38 permanently such that more durable and secure methods of attachment may be desirable. Those skilled in the art will appreciate that trucks are often used in off-road and unsteady environments. Therefore it may be desirable to use very secure and reliable mechanisms for attachment. It may be desirable to utilize more than one form of attachment.

The utility board 10 shown in FIG. 3 covers substantially all of the interior wall 32 of the tailgate 38. It may be desirable for the utility board 10 to cover only a portion of the interior wall 32. Optionally, additional utility boards may be attached to the sidewalls 39 of the truck bed 36. However, it may generally be desirable for the utility board 10 to be located on the interior wall of the tailgate 38 such that it may be more easily accessed and utilized as a horizontal working surface for a variety of activities and functions.

FIGS. 4-6 show a rod holder accessory 40 for use with the utility board 10. The rod holder 40 may include three cylinders 42 for holding fishing rods. The three cylinders 42 may be mounted on two transverse brackets 44. Each of the transverse brackets 44 may include a connector 46. In this embodiment, the connector 46 may be a cylindrical magnet or ferromagnetic metal. The connectors 46 may be configured to fit within connection sites 16 of utility board 10 shown in the prior drawings. Both the connectors 46 and the connection sites 16 as shown here are substantially cylindrical. Optionally, the connectors and connection sites may have a different geometry and may be parallelepiped, orthogonal, oval and/or may optionally include complementary topographical patterns.

In a preferred embodiment, as shown here, the connectors and connection sites are offset. Normally, very powerful magnets are difficult to separate from each other, meaning that use of high power magnets with the connection sites and connectors of the invention may result in difficulty removing an accessory from a utility board once they are attached. When the offset configuration shown in the drawings is used in conjunction with a rectangular bracket (including configurations where two parallel elongate brackets together form a rectangular shape) it may facilitate use of high strength magnets or other devices to provide very secure attachment. Because the connectors are offset, a bracket may provide additional leverage for an operator when removing an accessory. For example, the rod holder accessory 40 includes two leveraged corners 48, either of which may be grasped and pulled by an operator when removing the rod holder 40. The leveraged corners 48 are located at the regions of the bracket that are the maximum distances from the connectors. This configuration is possible when one or more brackets provide four corners and the connectors are located on diagonally opposite corners. The remaining two corners, themselves diagonally opposite of each other, then become the leveraged corners suitable for actuation to detach an accessory. In addition, each of the two leveraged corners may act as a fulcrum for the other when an accessory is lifted. By placing the connectors on diagonally opposite corners and thereby providing leveraged corners, the utility board and the accessories may be mounted using powerful magnets or other affixing devices while still providing for rapid and easy removal and replacement of various accessories.

FIGS. 7-9 show a gun rack accessory 50 for use with a utility board as shown in FIGS. 1-3. The gun rack 50 may include a rectangular bracket 52 having a front side 55 and a rear side 57. A typical gun rack 54 may be attached to and extend from the front side 55 of the bracket 52. The rear side 57 may include two connectors 56. As with the rod holder accessory 40, the connectors 56 may be positioned near diagonally opposite corners, thereby creating two leveraged corners 58. In this embodiment, the gun rack 54 is configured for holding two guns. Optionally, the gun rack may be configured to hold only one gun or three or more guns.

FIG. 10 shows another accessory, a knife and utensil holder 60 for use with a utility board in accordance with principles of the invention. The utensil holder 60 may have a rectangular bracket 64 having to connectors 66 attached to its rear side 68. A knife block 62 may extend from the front side 69 of the bracket 64. The connectors 66 may be positioned at diagonally opposite corners to create leveraged corners.

FIG. 11 shows another accessory for use with a utility board in accordance with the principles of the invention. Beer Pong stand 70 may have a substantially rectangular bracket 72 having a plurality of circular holes or cupholders 78. Two connectors 76 are positioned relatively close to two of the beer Pong stand's 70 three corners. Even though the bracket 72 is not rectangular, the stand 70 may still have a leveraged corner 79 located at the point on the bracket 72 having the furthest distance from the two connectors 76. Although bracket 72 does not provide a fourth corner opposite to the leveraged corner 79 to act as a fulcrum, the leveraged corner 79 still may provide the optimal position from which to lift the accessory from the utility board.

FIG. 12 shows an alternative embodiment of a utility board 100 that includes two alternative connection sites 90 and 108. Connection site 90 may have a cavity 91 and a button 92, and is explained in more detail in FIG. 13. Connection site 108 is a circular threaded or extending from the top surface 102 into the utility board 100. Utility board 100 includes a collection channel 104 in the top surface 102 that extends about most of the surface 102 but does not extend around the connection site 90. This may reduce or prevent exposure of the connection site 90 and any attached accessories to any fluids resulting from activity on the utility board 100. Optionally, one or both of connection sites 90 and 108 may be positioned inside the collection channel 104.

Figure 13:
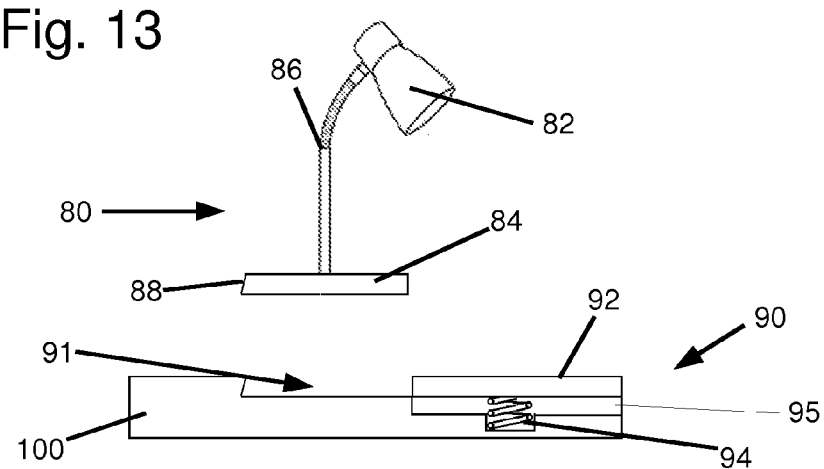
FIG. 13 is a lamp accessory for use with the alternative embodiment of a cutting board of FIG. 12.

FIG. 13 shows an accessory for use with the alternative embodiment for a utility board shown in FIG. 12 in accordance with the principles of the invention. The light accessory 80 may include a table lamp 82 attached to a bracket 84 by an adjustable neck 86. This accessory 80 may include an orthogonal bracket 84 having an angled side 88. The bracket 84 may be configured to fit into a connection sites 90 integrated into a utility board 100. The connection site 90 may include a cavity 91 having a button 92 adjacent to it. The button 92 may be biased upward by a spring 94. When the button 92 is pressed, it may recede into well 95 and provides sufficient access to insert bracket 84. Once the bracket 84 is inserted, the button 92 may return to its original position, thereby holding bracket 84 with in cavity 91. To remove the accessory 80, the button 92 is pressed so that the bracket 84 may be removed.

Figure 14:
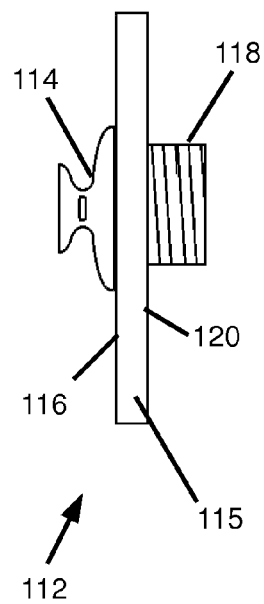
FIG. 14 is a front elevational view of a clamp accessory for use with the alternative embodiment of a cutting board of FIG. 12.
Figure 15:
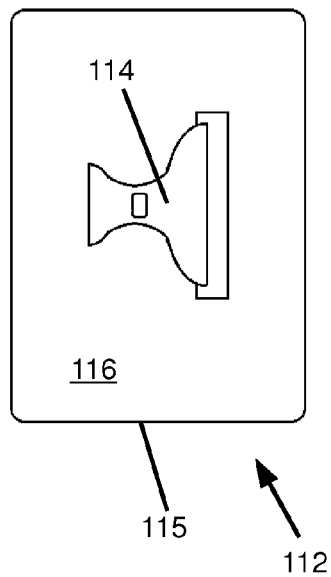
FIG. 15 is a top plan view of a clamp accessory for use with the alternative embodiment of a cutting board of FIG. 12.
Figure 16:
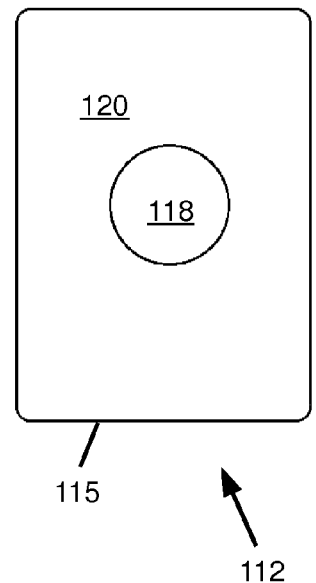
FIG. 16 is a bottom plan view of a clamp accessory for use with the alternative embodiment of a cutting board of FIG. 12.

FIGS. 14-16 show a clamp accessory 112 for use with connection site 108 of utility board 100 in accordance with the principles of the invention. Clamp accessory 112 may include a bracket 115. A spring biased clamp 114 may be rotatably attached to the top surface 116 of the bracket 115. A cylindrical threaded post 118 may extend downward from the bottom surface 120 of the bracket 115. In use, the post 118 may be placed within a connection site 108 and the accessory 112 may be rotated such that the threading of post 118 engages the threading of connection site 108. The clamp accessory 112 may thus be screwed into a utility board 100 such that the bottom surface 120 of the bracket 115 is secured in place by an interference fit with the top surface 102 of the utility board 100. The clamp accessory 112 may be useful for securing objects to the utility board 100. For example a fish's tail may be secured by the clamp 114.

FIG. 17 shows the utility board 10 of FIG. 1 having two gun racks 50, as shown in FIGS. 7-9 attached. When the utility board is attached to the interior wall of a tailgate and the tail gate is placed in the vertical, closed position, the gun racks may be used to hold guns or similar devices while the vehicle is used for transporation. When a cover is placed over a truck bed, guns placed on the gun rack are concealed from view, as opposed to gun racks in the rear window of a truck's cab. This may deter theft.

FIG. 18 shows the utility board 10 of FIG. 1 having a utensil holder or knife block accessory 60 and a clamp accessory 113 attached. The clamp accessory 113 is similar to the clamp accessory 112 shown in FIGS. 14-16, except that it has two offset circular magnets that serves as connectors instead of a threaded post. In this configuration, the utility board 10 may be optimized for cleaning fish. A fish's tail may be held in place by the clamp accessory 113 while the knife block 60 provide easy access to knives or other utensils useful in the cleaning, fileting and preparing of fish or other animals.

Whereas, the present invention has been described in relation to the drawings attached hereto, it should be understood that other and further modifications, apart from those shown or suggested herein, may be made within the spirit and scope of this invention. Descriptions of the embodiments shown in the drawings should not be construed as limiting or defining the ordinary and plain meanings of the terms of the claims unless such is explicitly indicated.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

What is claimed is:

1. An apparatus for mounting on a tailgate of a vehicle, comprising:
   a utility board having a rectangular shape further comprising a planar top surface, a planar bottom surface, two short opposing side surfaces having a first length, and two long opposing side surfaces having a length greater than the first length;
   a securing mechanism integral with said planar bottom surface, wherein said securing mechanism adapts the utility board to attach to an interior wall of a tailgate;
   a collection channel extending continuously about a periphery of said upper planar top surface, wherein said collection channel is capable of receiving liquids to prevent runoff off of said utility board;
   at least one pair of connection sites integral with said top surface, wherein said connection sites in the at least one pair are spatially oriented relative to one of the short opposing side surfaces such that a line intersecting both of the connection sites in the at least one pair is not parallel with either of the two short opposing side surfaces or the two long opposing side surfaces,
   and wherein each of said connection sites comprise walls and a bottom floor surface parallel with said planar top surface and said planar bottom surface, wherein said bottom floor surface comprises a material with magnetic properties, such that accessories are capable of being flushly mounted thereto.

2. The utility board of claim 1, further comprising a fishing rod holder comprising at least two cylinders and at least one transverse bracket, wherein each of the at least one transverse bracket comprises a magnetic connector adapted to engage one of the connection sites in the at least one pair of connection sites and flushly mount to said bottom floor surface.

3. The utility board of claim 1, further comprising a gun rack, wherein said gun rack configured to hold two or more guns, comprising a rectangular bracket with a front side and a rear side, wherein said rear side comprises at least two magnetic connectors adapted to each engage one of the connection sites in the at least one pair of connection sites and flushly mount to said bottom floor surface.

4. The utility board of claim 1, further comprising a knife utensil holder, wherein said knife utensil holder comprises a knife block and a rectangular bracket having two magnetic connectors adapted to each engage one of the connection sites in the at least one pair of connection sites and flushly mount to said bottom floor surface.

5. The utility board of claim 1, further comprising a beer pong stand, wherein said beer pong stand comprises three corners and a plurality of cup holders, wherein said beer pong stand comprises a bracket further comprising two magnetic connectors adapted to each engage one of the connection sites in the at least one pair of connection sites and flushly mount to said bottom floor surface.

6. An apparatus for mounting on a tailgate of a vehicle, comprising:
- a utility board having a rectangular shape further comprising a planar top surface, a planar bottom surface, two short opposing side surfaces having a first length, and two long opposing side surfaces having a length greater than the first length;
- a securing mechanism integral with said planar bottom surface, wherein said securing mechanism adapts the utility board to attach to an interior wall of a tailgate;
- a collection channel extending continuously about a periphery of said upper planar top surface, wherein said collection channel is capable of receiving liquids to prevent runoff off of said utility board;
- at least one pair of connection sites integral with said top surface, wherein each connection site in the at least one pair is of an identical shape and the connection sites in the at least one pair are together spatially oriented adjacent to one of the short opposing side surfaces and angularly disposed relative to the adjacent short opposing side surface such that a line intersecting both of the connection sites in the at least one pair forms an angle of between thirty and sixty degrees with the adjacent short opposing side surfaces;
- and wherein each of said connection sites comprise walls and a bottom floor surface parallel with said planar top surface and said planar bottom surface, wherein said bottom floor surface comprises a material with magnetic properties, such that accessories are capable of being flushly mounted thereto.

7. The utility board of claim 6, further comprising a fishing rod holder comprising at least two cylinders and at least one transverse bracket, wherein each of the at least one transverse bracket comprises a magnetic connector adapted to engage one of the connection sites in the at least one pair of connection sites and flushly mount to said bottom floor surface.

8. The utility board of claim 6, further comprising a gun rack, wherein said gun rack configured to hold two or more guns, comprising a rectangular bracket with a front side and a rear side, wherein said rear side comprises at least two magnetic connectors adapted to each engage one of the connection sites in the at least one pair of connection sites and flushly mount to said bottom floor surface.

9. The utility board of claim 6, further comprising a knife utensil holder, wherein said knife utensil holder comprises a knife block and a rectangular bracket having two magnetic connectors adapted to each engage one of the connection sites in the at least one pair of connection sites and flushly mount to said bottom floor surface.

10. The utility board of claim 6, further comprising a beer pong stand, wherein said beer pong stand comprises three corners and a plurality of cup holders, wherein said beer pong stand comprises a bracket further comprising two magnetic connectors adapted to each engage one of the connection sites in the at least one pair of connection sites and flushly mount to said bottom floor surface.

11. An apparatus for mounting on a tailgate of a vehicle, comprising:
- a utility board having a rectangular shape further comprising a planar top surface, a planar bottom surface, two short opposing side surfaces having a first length, and two long opposing side surfaces having a length greater than the first length;
- a securing mechanism integral with said planar bottom surface, wherein said securing mechanism adapts the utility board to attach to an interior wall of a tailgate;
- a collection channel extending continuously about a periphery of said upper planar top surface, wherein said collection channel is capable of receiving liquids to prevent runoff off of said utility board;
- at least one pair of connection sites integral with said top surface, wherein each connection site in the at least one pair is of an identical shape and the connection sites in the at least one pair are spatially oriented relative to one of the short opposing side surfaces such that a line intersecting both of the connection sites in the at least one pair is not parallel with either of the two short opposing side surfaces or the two long opposing side surfaces,
- wherein each of said connection sites comprise walls and a bottom floor surface parallel with said planar top surface and said planar bottom surface, wherein said bottom floor surface comprises a material with magnetic properties, such that accessories are capable of being flushly mounted thereto; and
- a plurality of removably mounted plugs, wherein each of said removably mounted plugs comprises a plug body and a planar cap, wherein each of said removably mounted plugs are removably mounted to said bottom floor surface in one of said connection sites such that said planar cap is coplanar with the planar top surface of said utility board.

12. The utility board of claim 11, further comprising a fishing rod holder comprising at least two cylinders and at least one transverse bracket, wherein each of the at least one transverse bracket comprises a magnetic connector adapted to engage one of the connection sites in the at least one pair of connection sites and flushly mount to said bottom floor surface.

13. The utility board of claim 11, further comprising a gun rack, wherein said gun rack configured to hold two or more guns, comprising a rectangular bracket with a front side and a rear side, wherein said rear side comprises at least two magnetic connectors adapted to each engage one of the connection sites in the at least one pair of connection sites and flushly mount to said bottom floor surface.

14. The utility board of claim 11, further comprising a knife utensil holder, wherein said knife utensil holder comprises a knife block and a rectangular bracket having two magnetic connectors adapted to each engage one of the connection sites in the at least one pair of connection sites and flushly mount to said bottom floor surface.

15. The utility board of claim 11, further comprising a beer pong stand, wherein said beer pong stand comprises three corners and a plurality of cup holders, wherein said beer pong stand comprises a bracket further comprising two magnetic connectors adapted to each engage one of the connection sites in the at least one pair of connection sites and flushly mount to said bottom floor surface.

16. An apparatus for mounting on a tailgate of a vehicle, comprising:
- a utility board having a rectangular shape further comprising a planar top surface, a planar bottom surface, two short opposing side surfaces having a first length, and two long opposing side surfaces having a length greater than the first length;

a securing mechanism integral with said planar bottom surface, wherein said securing mechanism adapts the utility board to attach to an interior wall of a tailgate;

a collection channel extending continuously about a periphery of said upper planar top surface, wherein said collection channel is capable of receiving liquids to prevent runoff off of said utility board;

at least one pair of connection sites integral with said top surface, wherein each connection site in the at least one pair is of an identical shape and the connection sites in the at least one pair are spatially oriented relative to one of the short opposing side surfaces such that a line intersecting both of the connection sites in the at least one pair is not parallel with either of the two short opposing side surfaces or the two long opposing side surfaces, wherein each of said connection sites comprise walls and a bottom floor surface parallel with said planar top surface and said planar bottom surface, wherein said bottom floor surface comprises a material with magnetic properties, such that accessories are capable of being flushly mounted thereto;

and wherein said bottom floor surface comprises a coating to prevent deterioration of said bottom floor surface.

17. The utility board of claim 16, further comprising a fishing rod holder comprising at least two cylinders and at least one transverse bracket, wherein each of the at least one transverse bracket comprises a magnetic connector adapted to engage one of the connection sites in the at least one pair of connection sites and flushly mount to said bottom floor surface.

18. The utility board of claim 16, further comprising a gun rack, wherein said gun rack configured to hold two or more guns, comprising a rectangular bracket with a front side and a rear side, wherein said rear side comprises at least two magnetic connectors adapted to each engage one of the connection sites in the at least one pair of connection sites and flushly mount to said bottom floor surface.

19. The utility board of claim 16, further comprising a knife utensil holder, wherein said knife utensil holder comprises a knife block and a rectangular bracket having two magnetic connectors adapted to each engage one of the connection sites in the at least one pair of connection sites and flushly mount to said bottom floor surface.

20. The utility board of claim 16, further comprising a beer pong stand, wherein said beer pong stand comprises three corners and a plurality of cup holders, wherein said beer pong stand comprises a bracket further comprising two magnetic connectors adapted to each engage one of the connection sites in the at least one pair of connection sites and capable of flushly mount to said bottom floor surface.

* * * * *